US012132840B2

(12) United States Patent
Alomair

(10) Patent No.: US 12,132,840 B2
(45) Date of Patent: Oct. 29, 2024

(54) PARITY CHECK MESSAGE AUTHENTICATION CODE

(71) Applicant: The King Abdulaziz City for Science and Technology, Riyadh (SA)

(72) Inventor: Basel Saleh Alomair, Riyadh (SA)

(73) Assignee: The King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 15/188,937

(22) Filed: Jun. 21, 2016

(65) Prior Publication Data

US 2017/0366355 A1    Dec. 21, 2017

(51) Int. Cl.
*H04L 9/32* (2006.01)
*H04L 9/06* (2006.01)
*H04L 9/40* (2022.01)

(52) U.S. Cl.
CPC .......... *H04L 9/3242* (2013.01); *H04L 9/0643* (2013.01); *H04L 63/123* (2013.01)

(58) Field of Classification Search
CPC .... H04L 9/3242; H04L 9/0643; H04L 63/123
See application file for complete search history.

(56) References Cited

U.S. PATENT DOCUMENTS

| | | | | | |
|---|---|---|---|---|---|
| 5,822,458 | A | * | 10/1998 | Silverstein | H04N 19/85 382/233 |
| 2002/0087860 | A1 | * | 7/2002 | William Kravitz | G06F 21/10 713/168 |
| 2010/0031021 | A1 | * | 2/2010 | Arnold | H04L 9/0637 713/155 |
| 2010/0111296 | A1 | * | 5/2010 | Brown | H04L 9/0643 380/28 |
| 2018/0123785 | A1 | * | 5/2018 | Chen | H04L 9/0869 |

OTHER PUBLICATIONS

Dierks et al. (RFC 4346: The Transport Layer Security (TLS) Protocol Version 1.1, Apr. 2006, 87 pages) (Year: 2006).*
Alomair (Authenticated Encryption: How Reordering Can Impact Performance. ACNS 2012. 20 pages) (Year: 2012).*
Toral et al. (Stochastic Numerical Methods: An Introduction for Students and Scientists, pp. 327-335, 2014) (Year: 2014).*

* cited by examiner

*Primary Examiner* — Oleg Korsak
(74) *Attorney, Agent, or Firm* — Dennemeyer & Associates LLC

(57) ABSTRACT

The invention provides a method and system for authenticating a plaintext message at a sender computing device and verifying the integrity and authenticity of the plaintext message at a receiver computing device. Firstly, the method includes prepending a random string to the plaintext message and then generating a ciphertext corresponding to the plaintext message by encrypting the plaintext message prepended with the random string using an encryption algorithm. The method also includes the step of generating a compressed image of the plaintext message and generates an authentication tag from the compressed image of the plaintext message and the random string. Thereafter, the method transmits both the ciphertext and the authentication tag generated at the sender computing device to the receiver computing device. The receiver computing device, on receiving the ciphertext and the authentication tag corresponding to the plaintext message, verifies the integrity and authenticity of the plaintext message.

10 Claims, 7 Drawing Sheets

PARITY CHECK MESSAGE AUTHENTICATION CODE

The invention generally relates to the field of authenticating a plaintext message. More specifically, the invention relates to a method and system for enabling a sender computing device for authenticating a plaintext message and verifying the integrity and authenticity of the plaintext message at a receiver computing device.

BACKGROUND OF THE INVENTION

With the intensive use of digital communication, efficient techniques for encrypting and authenticating messages that are exchanged over insecure channels of communication are a key requirement. Cryptography is a technique used for preserving the integrity of messages transmitted over public and insecure channels of communication. One of the most widely used cryptographic techniques for preserving the integrity and authenticity of messages are a Message Authentication Code (MAC). A MAC is an algorithm that takes a plaintext message as input and outputs an authentication tag. Given the message and its corresponding tag, a receiver is able to verify the integrity and authenticity of the message with very high probability.

The earliest MAC algorithms for providing data integrity were typically based on keyed hash function, block ciphers and the like. The MAC generation method using a block cipher includes a Cipher Block Chaining (CBC)-MAC algorithm using a CBC operation mode, a CMAC algorithm and so on. The CBC-MAC algorithm chains a previous block ciphertext and a next block plaintext to create the next block ciphertext. The MAC generation using a block cipher operation mode is frequently used to encrypt data.

In many real-life applications in which message integrity needs to be preserved, the privacy of the message also needs to be preserved. Therefore, there has been increasing attention recently to design fast and energy efficient authenticated ciphers.

An authenticated cipher is an algorithm that takes a plaintext message as input and outputs two pieces of information namely a ciphertext and an authentication tag. In authenticated ciphers, the authentication tag can be a function of either the plaintext or the ciphertext. Computing the authentication tag as a function of the ciphertext implies that a standard MAC analysis must be used since sending the ciphertext-tag pair is equivalent to sending the message tag pair in standard MACs. Computing the authentication tag as a function of the plaintext, however, is fundamentally different as two outputs of the same input are obtained. Therefore, for a successful forgery, the adversary must come up with two values (ciphertext and tag) that are mapped correctly to the same input (plaintext).

Further, the block ciphers used in MAC and authenticated ciphers are replaced by cryptographic hash functions as they are faster and yields faster designs. However, the fastest MACs in the prior art belong to another class of MAC algorithms namely MACs based on universal hash-function families.

However, the universal hash families are not cryptographic functions. That is, using universal hash families may lead to exposure of the secret hashing key added either before blockcipher calls or after blockcipher calls for encrypting the plaintext message.

Later, a stream cipher based authenticated encryption scheme initiated for verifying the integrity of the plaintext message. A stream cipher is an encryption primitive frequently used to provide confidentiality similar to the block cipher. Stream cipher can be implemented in lightweight hardware and operated at high speed in software. Stream cipher creates a ciphertext by Exclusive-ORing (XORing) a message with a key stream generated using a secret key and thus a user ignorant of the key streams can readily change a message at a desired part. Due to such a characteristic, a stream cipher is considered to be difficult to provide a MAC function. Further, unlike their block cipher based counterparts, such stream cipher based encryption techniques are vulnerable to differential attacks.

Though the available authenticated ciphers for encrypting and authenticating the plaintext message are generated in high speeds which are capable of keeping up with high speed networks, these techniques require large number of processor cycles and do not allow the processors to perform other operations.

Therefore, in light of the above, there is a need for a method and system for generating more efficient and secure authentication methods for authenticating a plaintext message.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
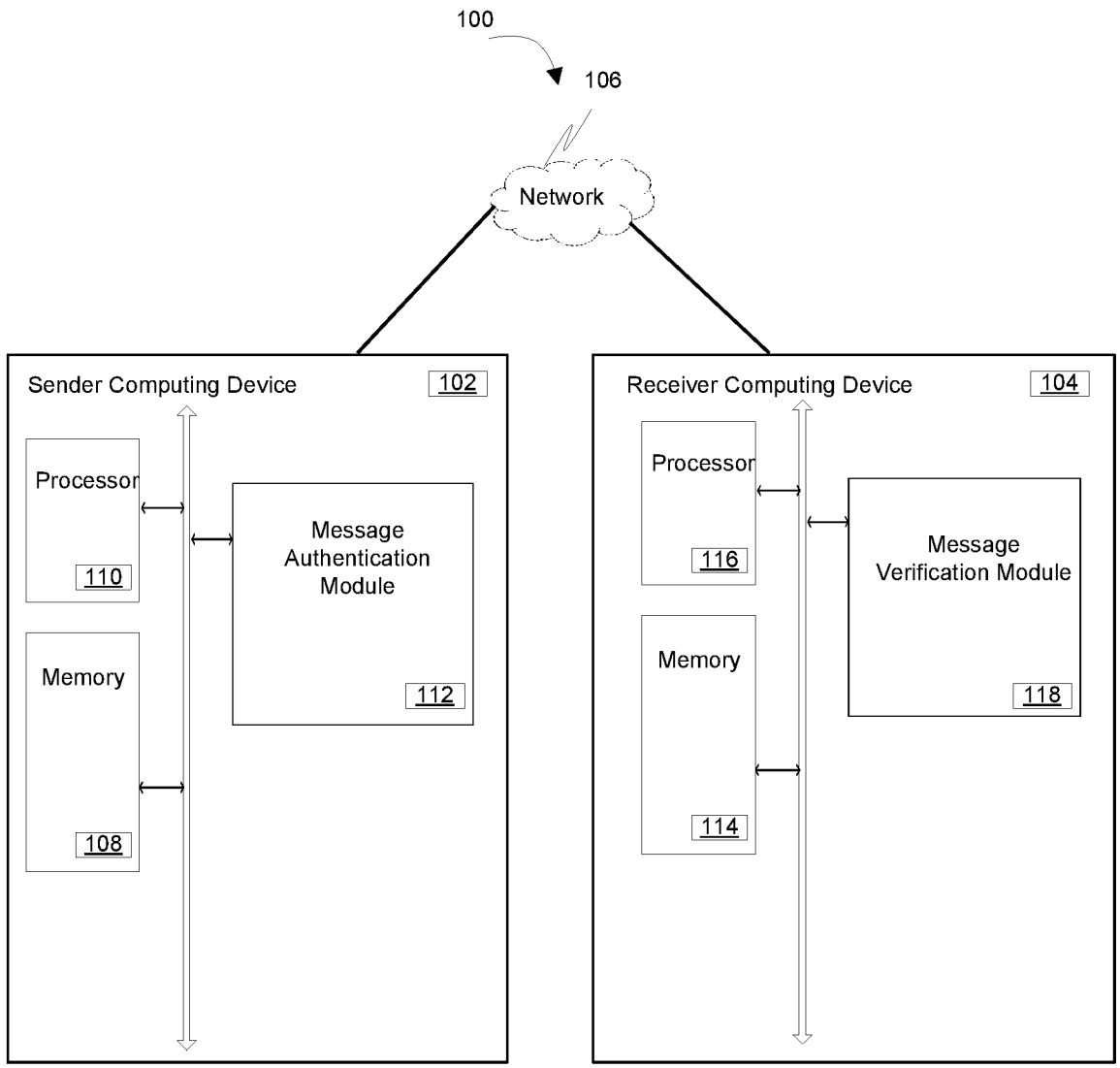
FIG. 1 illustrates a system for authenticating a plaintext message and verifying the integrity and authenticity of the plaintext message in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to authenticating a plaintext message at a sender computing device and to verify the integrity and authenticity of the plaintext message at a receiver computing device.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for authenticating a plaintext message at a sender computing device and verifying the integrity and authenticity of the plaintext message at a receiver computing device. Firstly, the method includes prepending a random string to the plaintext message and then generating a ciphertext corresponding to the plaintext message by encrypting the plaintext message prepended with the random string using an encryption algorithm. The method also includes the step of generating a compressed image of the plaintext message and generates an authentication tag from the compressed image of the plaintext message and the random string. Thereafter, the method transmits both the ciphertext and the authentication tag generated at the sender computing device to the receiver computing device. The receiver computing device, on receiving the ciphertext and the authentication tag corresponding to the plaintext message, verifies the integrity and authenticity of the plaintext message.

FIG. 1 illustrates a system 100 for authenticating a plaintext message and verifying the integrity and authenticity of the plaintext message in accordance with an embodiment of the invention.

As illustrated in FIG. 1, system 100 includes a sender computing device 102 and a receiver computing device 104. Sender computing device 102 and receiver computing device 104 can be for example, but not limited to, a mobile device, a personal digital assistant, a computer, a laptop, a smart phone and a tablet. Sender computing device 102 and receiver computing device 104 communicate with each other over a network 106 such as, but not limited to, near field communication (NFC), wiFi, iBeacon™, internet, intranet, Local Area Network (LAN), Wireless Local Area Network (WLAN), Wireless Wide Area Network (WWAN), Wireless Metropolitan Area Network (WMAN), Wide Area Network (WAN) and telecommunication network.

Sender computing device 102 includes a memory 108 and a processor 110 communicatively coupled to memory 108. Sender computing device 102 further includes a message authentication module 112 communicatively coupled to both memory 108 and processor 110. Message authentication module 112 is utilized for authenticating a plaintext message received as input at sender computing device 102. Message authentication module 112 is further described in detail in conjunction with FIG. 2.

Once, the plaintext message is authenticated at sender computing device 102, the plaintext message is transmitted to receiver computing device 104 over network 106.

Moving on, receiver computing device 104 includes a memory 114 and a processor 116 communicatively coupled to memory 114. Receiver computing device 114, further, includes a message verification module 118 communicatively coupled to both memory 114 and processor 116. Message verification module 118 verifies the integrity and authenticity of the plaintext message received from sender computing device 102. Message verification module 118 is further described in detail in conjunction with FIG. 3.

Figure 2:
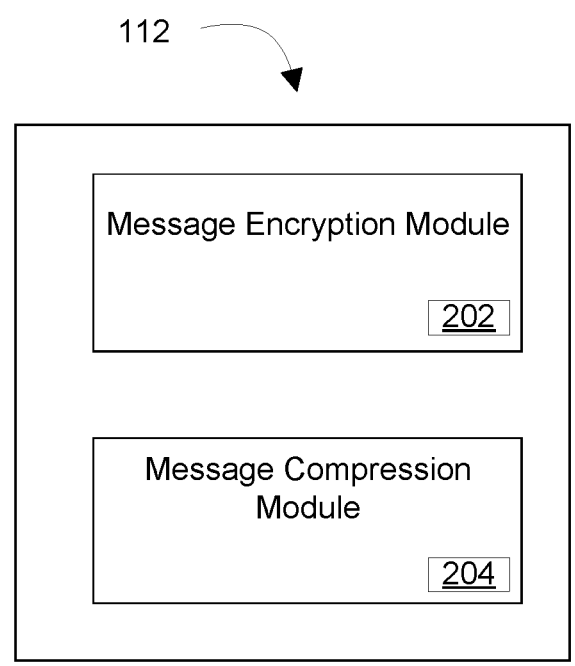
FIG. 2 illustrates a message authentication module for generating a ciphertext and an authentication tag corresponding to the plaintext message at a sender computing device in accordance with an embodiment of the invention.

FIG. 2 illustrates message authentication module 112 for authenticating the plaintext message at sender computing device 102 in accordance with an embodiment of the invention.

As illustrated in FIG. 2, message authentication module 112 includes a message encryption module 202 and a message compression module 204.

Message encryption module 202 encrypts the plaintext message prepended with the random string by utilizing an encryption algorithm embedded within message encryption module 202 to generate a ciphertext corresponding to the plaintext message. The encryption algorithm may include, but need not be, limited to, a block cipher encryption and the like. Message encryption module 202 generates a ciphertext corresponding to the plaintext message, by generating a nonce of length 'n' bits by utilizing the encryption algorithm. Then, the nonce is prepended to the plaintext message at a first end of the plaintext message and the nonce is considered as a first block of the plaintext message for encrypting.

Once, the ciphertext of the plaintext message is generated, message authentication module 112 generates a compressed image of the plaintext message by utilizing message compression module 204 embedded within message authentication module 112. The compressed image of the plaintext message is generated by appending a unique end-of-message character to an end of the plaintext message. On receiving a security parameter 'n', the plaintext message is divided into a plurality of blocks. Each block of the plurality of blocks is of length 'n' bits except a last block of the plurality of the blocks. The plurality of blocks corresponding to the plaintext message is then compressed by appending '1' number of zeros to the last block of the plurality of blocks to generate an 'n' bit long string of the last block. Here, '1' is computed from the security parameter 'n' and modulo 'n' of the plaintext message. Thereafter, message compression module 204 generates an authentication tag by computing the compressed image of the plaintext message by performing an XOR operation on the plurality of blocks of the plaintext message.

Figure 3:
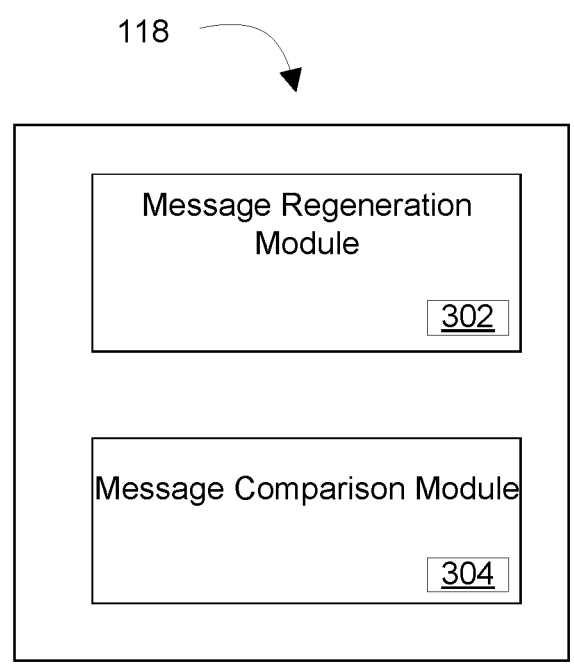
FIG. 3 illustrates a message verification module for verifying the integrity and authenticity of the plaintext message at a receiver computing device in accordance with an embodiment of the invention.

FIG. 3 illustrates a message verification module 118 for verifying the integrity and authenticity of the plaintext message received at a receiver computing device 104 in accordance with an embodiment of the invention.

As illustrated in FIG. 3, message verification module 118 includes a message regeneration module 302 and a message comparison module 304.

On receiving the ciphertext and the authentication tag at receiver computing device 104, receiver computing device 104 is configured to decrypt the ciphertext for obtaining the plaintext message and the random string. Further, the plaintext message and the random string obtained at receiver computing device 104 are utilized to regenerate an authentication tag by utilizing message regeneration module 302 embedded within message verification module 118.

Thereafter, message comparison module 304 embedded within message verification module 118 is utilized to compare the authentication tag regenerated at receiver computing device 104 with the authentication tag received by receiver computing device 104 for verifying the integrity and authenticity of the plaintext message. Thus, if the authentication tag regenerated by receiver computing device 104 matches with the authentication tag received by receiver computing device 104, the integrity and authenticity of the plaintext message is determined to be verified.

The generation of the ciphertext and the authentication tag for encrypting the message at sender computing device 102 and the verification of the integrity and authenticity of the plaintext message at receiver computing device 104 is further described in detail in accordance with various exemplary embodiments of the invention as follows.

In accordance with an exemplary embodiment of the invention, message authentication module 112 utilizes a standard model for analyzing authenticated encryption systems to encrypt the plaintext message prepended with the random string. For instance, let $\varepsilon$ be an underlying encryption algorithm. The method and system for utilizing the underlying encryption algorithm $\varepsilon$ is based on the mode of operation, i.e., based on use of a nonce for encrypting the plaintext message. If the underlying encryption algorithm $\varepsilon$ requires the utilization of nonces, then the input to the algorithm $\varepsilon$ is a nonce-message pair(N; M). Similarly, if the underlying encryption algorithm $\varepsilon$ does not utilize the nonce, then the input to the underlying encryption algorithm $\varepsilon$ is simply the plaintext message.

For instance, let M be the plaintext message to be authenticated and n be a security parameter accepted by legitimate users to authenticate the plaintext message. In order to authenticate the plaintext message, message authentication module 112 divides the plaintext message M into K:=⌈|M|/n⌉ blocks, where each block is of length n-bits except the $K^{th}$ block. Further, let $\sigma$ be the n-bit compressed image of the plaintext message M, which is evaluated as follows.

$$\sigma = \Sigma_{i=1}^{k} M[i] (\mathrm{mod}\ 2^n)$$

where M[i] denotes the $i^{th}$ block of the plaintext message M.

Further, the compressed image of the plaintext message M according to the above equation is computed to generate a random string r drawn uniformly at random from $\{0, 1\}^n$. In addition, invertible function $f$ is utilized to encrypt the pair (r; M) for generating corresponding ciphertext as:

$$c \xleftarrow{\$} f(r, M)$$

and the authentication tag of the plaintext message M as:

$$\tau = \sigma + r (\mathrm{mod}\ 2^n)$$

The pair of ciphertext and authentication tag represented as (c, $\tau$) from the above two equations are then transmitted to an intended receiver for verifying the integrity and authenticity of the plaintext message.

The ciphertext c received by receiver computing device 104 is inverted (decrypted) to obtain the plaintext message M and the random string r. At receiver computing device 104, the plaintext message M is broken into n-bit blocks (M[i]'s) and the modular summation is computed as $\Sigma_i M[i]+r\ (\mathrm{mod}\ 2^n)$. The message is then authenticated if the summation is found to be congruent to the received authentication tag $\tau$. Then, the validity of the plaintext message is verified by satisfying the following integrity check:

$$\tau = \sum_{i=1}^{k} M[i] + r (\mathrm{mod}\ 2^n)$$

where $\tau$ is the received authentication tag while M[i]'s and r are obtained by decrypting the ciphertext.

In accordance with another exemplary embodiment of the invention, let M be the plaintext message to be authenticated and n be a security parameter accepted by legitimate users to authenticate the plaintext message. It is assumed that n is equal to the size of the blockcipher used to construct the encryption algorithm. In order to authenticate the plaintext message, message authentication module 112 appends a unique End-of-Message (EOM) character to the end of M and divides M into K:=⌈|M|/n⌉ blocks, where each block is of length n-bits except the $K^{th}$ block. The $K^{th}$ block of M is then appended with l zeros, where l=n−(|M|(mod n)) so that it becomes an n-bit long string. Further, let $\sigma$ be the n-bit compressed image of the plaintext message M, which is evaluated as follows.

$$\sigma = \Sigma_{i=1} M[i] (\mathrm{mod}\ 2^n)$$

where M[i] denotes the $i^{th}$ block of the plaintext message M.

Further, the compressed image of the plaintext message M according to the above equation is computed to generate a random string r drawn uniformly at random from $\{0, 1\}^n$ and prepended to M. Thereafter, using the underlying encryption algorithm $\varepsilon$, r||M is encrypted to obtain the corresponding ciphertext as, $$c = \varepsilon(N, r\|M)$$

where N is a nonce. Then, the authentication tag of M is computed as, $$\tau = \sigma r (\mathrm{mod}\ 2^n)$$

The tuple (N,c,$\tau$) are then transmitted to receiver computing device 104. Given (N, c), receiver computing device 104 decrypt the ciphertext to obtain the plaintext message M and the coin tosses r. Receiver computing device 104, then, breaks M into n-bit blocks (M[i]'s) and computes the modular summation $\Sigma_i M[i]+r\ (\mathrm{mod}\ 2^n)$. The message is authenticated if and only if the summation is congruent to the received tag $\tau$. The following integrity check must be satisfied in order to validate the message at receiver computing device 104.

$$\tau = \sum_{i=1}^{k} M[i] + r (\mathrm{mod}\ 2^n)$$

Figure 4:
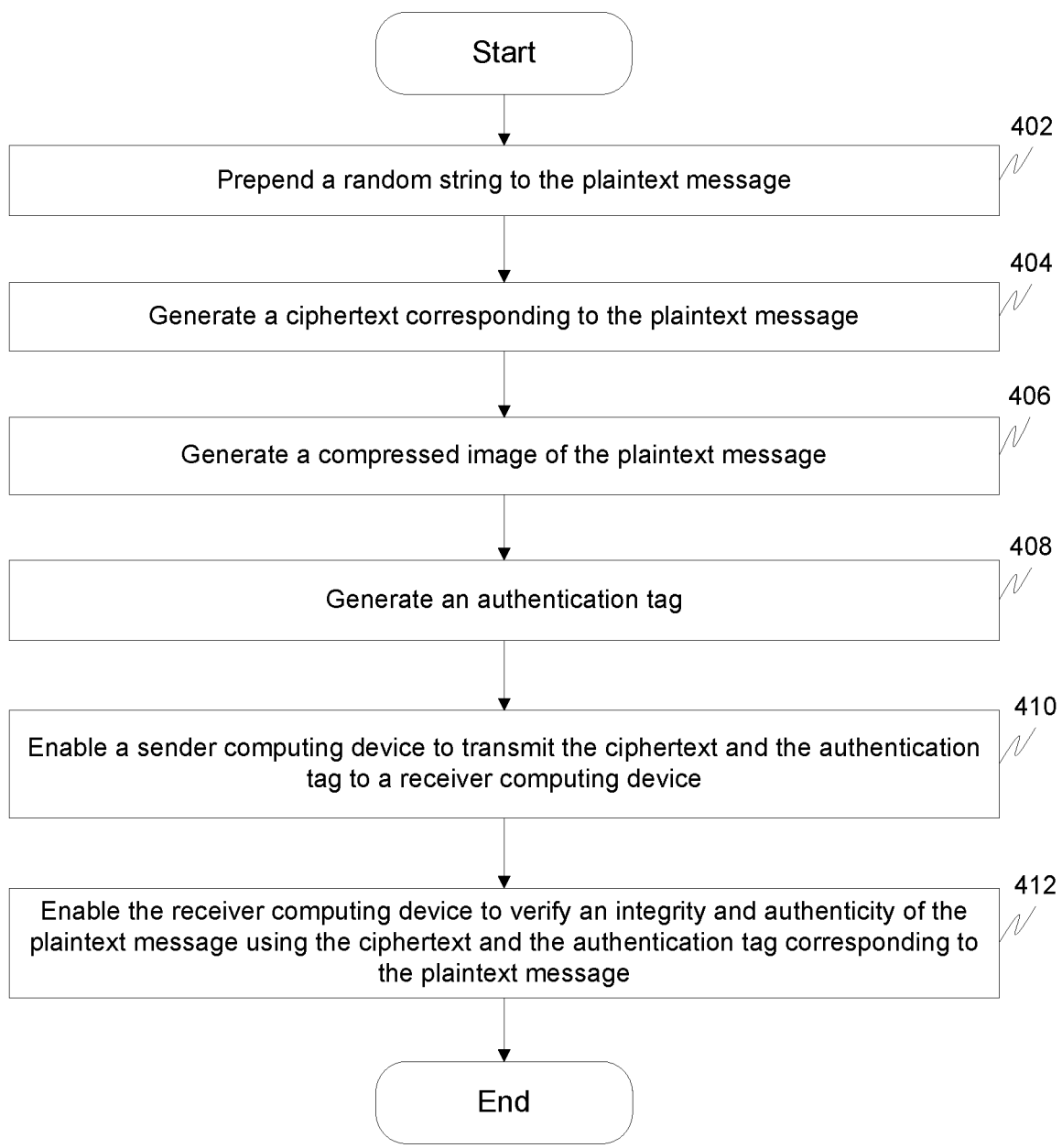
FIG. 4 illustrates a flowchart of a method for authenticating a plaintext message and verifying the integrity and authenticity of the plaintext message in accordance with an embodiment of the invention.

FIG. 4 illustrates a flowchart of a method for authenticating a plaintext message and verifying the integrity and authenticity of the plaintext message in accordance with an embodiment of the invention.

At step 402, the plaintext message received as input at sender computing device 102 is prepended with a random string and authenticated by utilizing message authentication module 112. Message authentication module 112 authenticates the plaintext message by encrypting the plaintext message prepended with the random string to generate a ciphertext at step 404 by utilizing an encryption algorithm included in message encryption module 202. Step 404 is further described in detail in conjunction with FIG. 5.

Moving on, at step 406, message compression module 204 generates a compressed image of the plaintext message at sender computing device 102 by dividing the plaintext message into plurality of blocks and appending '1' number of zeros to the last block of the plaintext message. Further, step 406 is described in detail in conjunction with FIG. 6. Moving on, at step 408, an authentication tag is generated from the compressed image of the plaintext message and the random string.

Thereafter, at step 410, sender computing device 102 is enabled to transmit the ciphertext generated at step 404 and the authentication tag generated at step 408 to receiver computing device 104. Later, at step 412, receiver computing device 104 is enabled to verify the integrity and authenticity of the plaintext message by utilizing the ciphertext and the authentication tag corresponding to the plaintext message received from the step 410. Step 412 is further described in detail in conjunction with FIG. 7.

Figure 5:
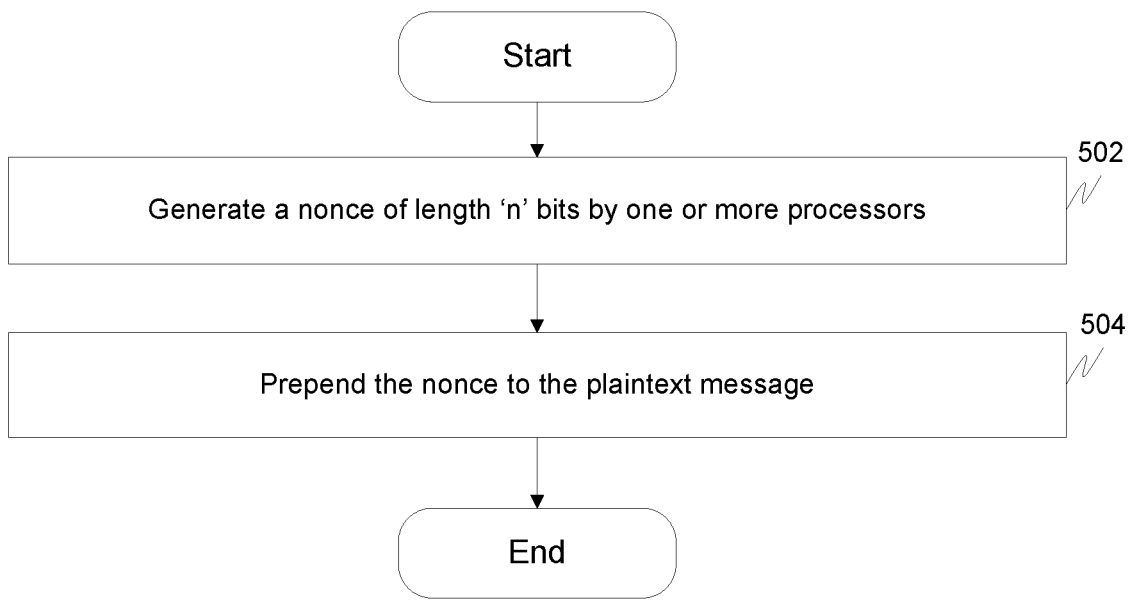
FIG. 5 illustrates a flowchart of a method for generating a ciphertext corresponding to the plaintext message by using a message encryption module at a sender computing device in accordance with an embodiment of the invention.

FIG. 5 illustrates a flowchart of a method for generating ciphertext corresponding to the plaintext message using message encryption module 202 at sender computing device 102 in accordance with an embodiment of the invention.

At step 502, message encryption module 202 generates a nonce of length n-bits by utilizing the encryption algorithm embedded in message encryption module 202. Moving on, at step 504, the nonce is prepended to the plaintext message at a first end of the plaintext message and the nonce is considered as a first block of the plaintext message for encryption. Thus, the plaintext message encrypted by utilizing encryption algorithm generates the ciphertext corresponding to the plaintext message.

Figure 6:
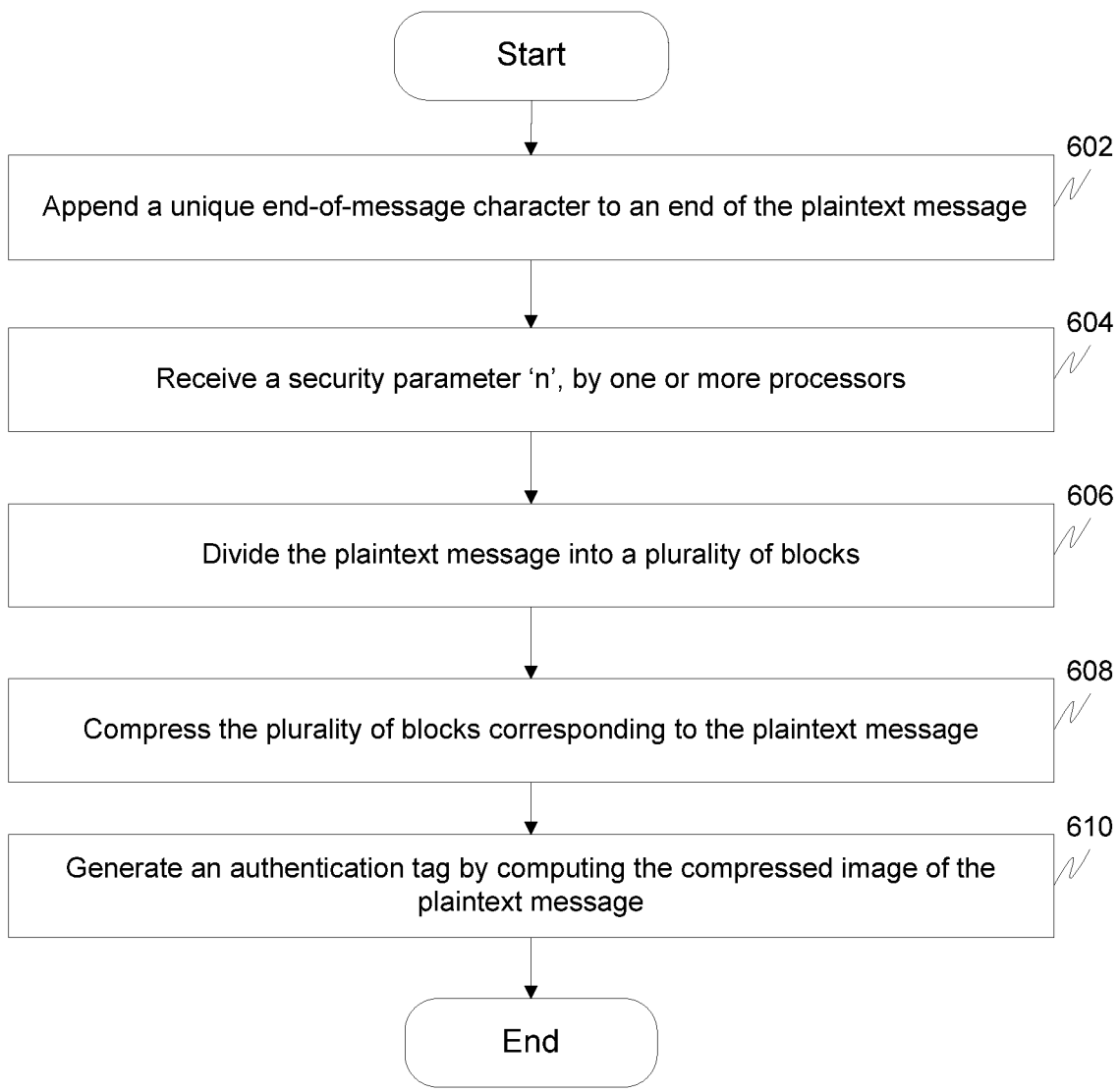
FIG. 6 illustrates a flowchart of a method for generating a compressed image of the plaintext message by using a message compression module at a sender computing device to generate an authentication tag in accordance with an embodiment of the invention.

FIG. 6 illustrates a flowchart of a method for generating a compressed image of the plaintext message using message compression module 204 at sender computing device 102 in accordance with an embodiment of the invention.

At step 602, message compression module 204 appends a unique end-of-message character to an end of the plaintext message and also receives a security parameter 'n' at step 604. Moving on, at step 606, the plaintext message is divided into a plurality of blocks, where each block of the plurality of blocks is of length 'n' bits except a last block of the plurality of blocks. Thereafter, at step 608, the plurality of blocks corresponding to the plaintext message is compressed by appending '1' number of zeros to the last block of the plurality of blocks to generate an 'n' bit long string of the last block. Later, at step 610, the compressed image of the plaintext message is computed to generate an authentication tag at sender computing device 102 by performing XOR operations on the plurality of blocks of the plaintext message.

Figure 7:
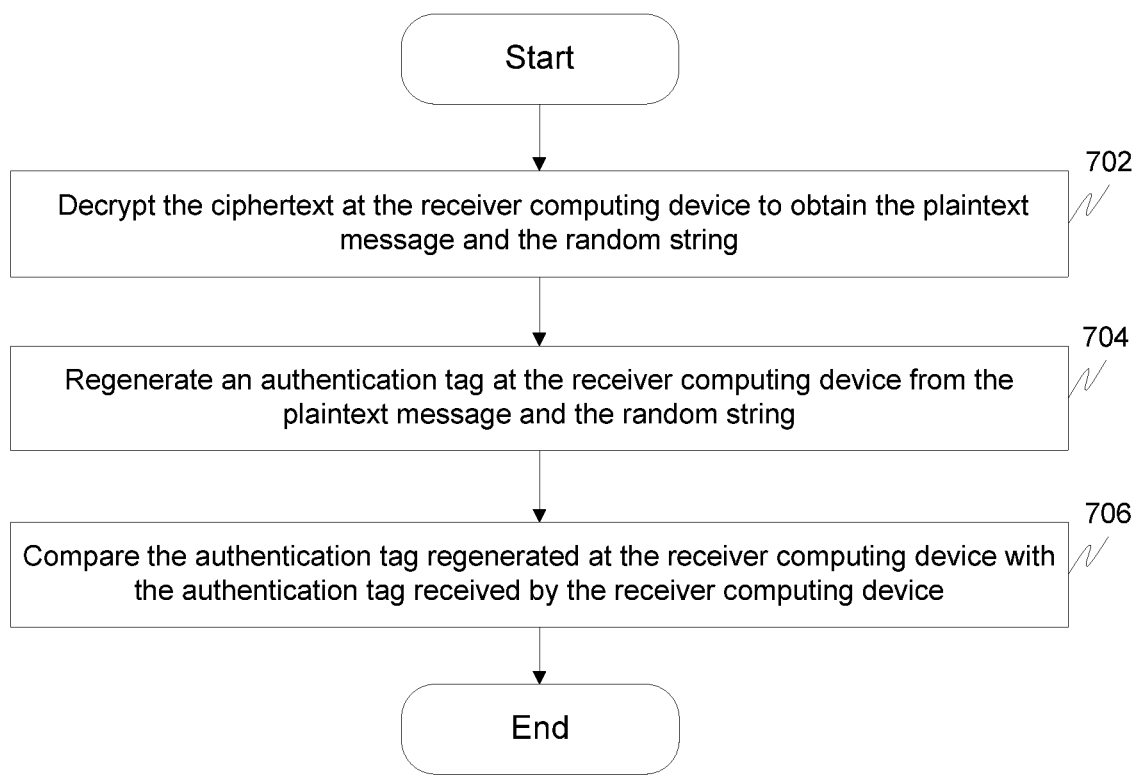
FIG. 7 illustrates a flowchart of a method for verifying the integrity and authenticity of the plaintext message by using a message verification module at a receiver computing device in accordance with an embodiment of the invention.

FIG. 7 illustrates a flowchart of a method for verifying the integrity and authenticity of the plaintext message using message verification module 118 at receiver computing device 104 in accordance with an embodiment of the invention.

At step 702, the ciphertext and the authentication tag received by receiver computing device 104, enables receiver computing device 104 to decrypt the ciphertext for obtaining the plaintext message and the random string. Moving on, at step 704, the receiver computing device 104 regenerates an authentication tag from the plaintext message and the random string obtained at step 702 by utilizing message regeneration module 302 embedded within message verification module 118. Thereafter, the authentication tag regenerated at receiver computing device 104 is compared with the authentication tag received by receiver computing device 104 by utilizing message comparison module 304 embedded within message verification module 118 in order to verify the integrity and authenticity of the plaintext message. Thus, if the authentication tag regenerated by message regeneration module 302 matches with the authentication tag received by receiver computing device 104, the integrity and authenticity of the plaintext message is determined to be verified.

An embodiment of the present invention may relate to a computer program product with a non-transitory computer readable storage medium having computer code thereon for performing various computer-implemented operations of the method and/or system disclosed herein. The media and computer code may be those specially designed and constructed for the purposes of the method and/or system disclosed herein, or they may be of the kind well known and available to those having skill in the computer software arts. Examples of computer-readable media include, but are not limited to, magnetic media, optical media, magneto-optical media and hardware devices that are specially configured to store and execute program code. Examples of computer code include machine code, such as produced by a compiler, and files containing higher-level code that are executed by a computer using an interpreter. For example, an embodiment of the present invention may be implemented using JAVA®, C++, or other object-oriented programming language and development tools. Aspects of the present invention may also be implemented using Hypertext Transport Protocol (HTTP), Procedural Scripting Languages and the like.

The present invention utilizes a method for authenticating a plaintext message and utilizing the functionality of encryption primitive for more efficient authentication of the plaintext message. The method utilizes both the ciphertext and the authentication tag for verifying the integrity and authenticity of the plaintext message.

Further, the present invention generates a simple parity check of plurality of blocks of the plaintext message to provide a secure authentication of the plaintext message by constructing an authenticated cipher that avoids the addition of universal hashing neither before block cipher encryption nor after block cipher encryption.

Additionally, the present invention generates a simple parity check of plurality of blocks of the plaintext message by constructing an authenticated cipher that can be parallelized into a single block cipher call. Further, the present invention is also used to eliminate the need to perform a block cipher call in all existing schemes and reduces the amount of energy consumed while authenticating a significant portion of the plaintext messages.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A computer-implemented method for authenticating plaintext message, the method comprising:
    prepending, by one or more processors, a random string to the plaintext message;
    generating, by one or more processors, a ciphertext corresponding to the plaintext message, wherein the plaintext message prepended with the random string is encrypted, by one or more processors, using an encryption algorithm to generate the ciphertext;
    generating, by the one or more processors, a compressed image of the plaintext message, the compressed image including a unique end-of-message character appended to an end of the plaintext message, wherein generating, by the one or more processors, a compressed image of the plaintext message comprises:
    receiving, by the one or more processors, a security parameter 'n';
    dividing, by the one or more processors, the plaintext message into a plurality of blocks, each block of the plurality of blocks having a length of 'n' bits except a last block of the plurality of blocks; and
    compressing, by the one or more processors, the plurality of blocks corresponding to the plaintext message by appending, by the one or more processors, '1' number of zeros to the last block to generate an 'n' bit long string of the last block, where '1' is computed from the security parameter 'n' and a modulo 'n' of the plaintext message;
    computing, by the one or more processors, the compressed image of the plaintext message a random string drawn uniformly at random from $\{0, 1\}^n$;
    utilizing an invertible function to encrypt the random string and the plaintext message to
    generate the ciphertext and the authentication tag, the authentication tag being the summation modulo $2^n$ of different plaintext blocks and a random number, r;
    enabling, by the one or more processors, a sender computing device to transmit the ciphertext and the authentication tag to a receiver computing device; and
    enabling, by the one or more processors, the receiver computing device to verify the integrity and authenticity of the plaintext message using the combination of the ciphertext and the authentication tag, which is the summation modulo $2^n$ of different plaintext blocks and a random number, r.

2. The computer-implemented method according to claim 1, wherein generating, by one or more processors, a ciphertext corresponding to the plaintext message further comprises:
    generating, by the one or more processors, a nonce of length 'n' bits; and
    prepending, by the one or more processors, the nonce to the plaintext message, wherein the nonce is a first block of the plaintext message to be encrypted.

3. The computer-implemented method according to claim 1, wherein an encryption algorithm is blockcipher encryption.

4. The computer-implemented method according to claim 1, wherein verifying the integrity and authenticity of the plaintext message comprises:
    decrypting, by the one or more processors, the ciphertext received at the receiver computing device to obtain the plaintext message and the random string;
    regenerating, by the one or more processors, an authentication tag at the receiver computing device from the plaintext message and the random string, wherein the plaintext message is broken into n-bit blocks and a modular summation is computed;
    authenticating the plaintext message when the modular summation is congruent to the authentication tag received at the receiver computing device; and
    verifying the plaintext message by satisfying an integrity check.

5. A system for authenticating plaintext message, the system comprising:
    a memory;
    a processor communicatively coupled to the memory, wherein the processor is configured to:
    prepend a random string to the plaintext message;
    generate a ciphertext corresponding to the plaintext message, wherein the plaintext message prepended with the random string is encrypted using an encryption algorithm to generate the ciphertext;
    generate a compressed image of the plaintext message by:
    appending a unique end-of-message character to an end of the plaintext message;
    receiving a security parameter 'n';
    dividing the plaintext message into a plurality of blocks, wherein each block of the plurality of blocks is of length 'n' bits except a last block of the plurality of blocks;
    and
    compressing the plurality of blocks corresponding to the plaintext message by appending '1' number of zeros to the last block of the plurality of blocks to generate an 'n' bit long string of the last block, wherein '1' is computed from the security parameter 'n' and modulo 'n' of the plaintext message;
    compute the compressed image of the plaintext message and generating a random string drawn uniformly at random from $\{0, 1\}^n$;
    utilize an invertible function to encrypt the random string and the plaintext message to generate the ciphertext and the authentication tag, the authentication tag being the summation modulo $2^n$ of different plaintext blocks and a random number, r;

enable a sender computing device to transmit the ciphertext and the authentication tag to a receiver computing device; and enable the receiver computing device to verify an integrity and authenticity of the plaintext message using only the ciphertext and the summation modulo $2^n$ of different plaintext blocks and a random number, r, provided as the authentication tag corresponding to the plaintext message.

6. The system according to claim 5, wherein the processor is configured to generate a ciphertext corresponding to the plaintext message by:

generating a nonce of length 'n' bits; and prepending the nonce to the plaintext message, wherein the nonce is a first block of the plaintext message to be encrypted.

7. The system according to claim 5, wherein the processor is configured to verify the integrity and authenticity of the plaintext message by:

decrypting the ciphertext at the receiver computing device to obtain the plaintext message and the random string;

regenerating an authentication tag at the receiver computing device from the plaintext message and the random string, wherein the plaintext message is broken into n-bit blocks and a modular summation is computed;

authenticating the plaintext message when the modular summation is congruent to the authentication tag received at the receiver computing device; and verifying the plaintext message by satisfying an integrity check.

8. A computer program product for authenticating plaintext message, the computer program product comprising a non-transitory computer readable storage medium having program instructions stored therein, the program instructions readable/executable by a processor to cause the processor to:

prepend a random string to the plaintext message;

generate a ciphertext corresponding to the plaintext message, wherein the plaintext message prepended with the random string is encrypted using an encryption algorithm to generate the ciphertext;

generate a compressed image of the plaintext message by:

appending a unique end-of-message character to an end of the plaintext message;

receiving a security parameter 'n';

dividing the plaintext message into a plurality of blocks, wherein each block of the plurality of blocks is of length 'n' bits except a last block of the plurality of blocks; and compressing the plurality of blocks corresponding to the plaintext message by appending '1' number of zeros to the last block of the plurality of blocks to generate an 'n' bit long string of the last block, wherein '1' is computed from the security parameter 'n' and modulo 'n' of the plaintext message;

compute the compressed image of the plaintext message and generating a random string drawn uniformly at random from $\{0, 1\}^n$;

utilize an invertible function to encrypt the random string and the plaintext message to generate the ciphertext and the authentication tag, the authentication tag being the summation modulo $2^n$ of different plaintext blocks and a random number, r;

enable a sender computing device to transmit the ciphertext and the authentication tag to a receiver computing device; and enable the receiver computing device to verify an integrity and authenticity of the plaintext message using only the ciphertext and the summation modulo $2^n$ of different plaintext blocks and a random number, r, provided as the authentication tag corresponding to the plaintext message.

9. The computer program product according to claim 8, wherein the program instructions further cause the processor to generate a ciphertext corresponding to the plaintext message by:

generating a nonce of length 'n' bits; and prepending the nonce to the plaintext message, wherein the nonce is a first block of the plaintext message to be encrypted.

10. The computer program product according to claim 8, wherein the program instructions cause the processor to verify the integrity and authenticity of the plaintext message by:

decrypting the ciphertext at the receiver computing device to obtain the plaintext message and the random string;

regenerating an authentication tag at the receiver computing device from the plaintext message and the random string, wherein the plaintext message is broken into n-bit blocks and a modular summation is computed;

authenticating the plaintext message when the modular summation is congruent to the authentication tag received at the receiver computing device; and verifying the plaintext message by satisfying an integrity check.

* * * * *